Figure 1:
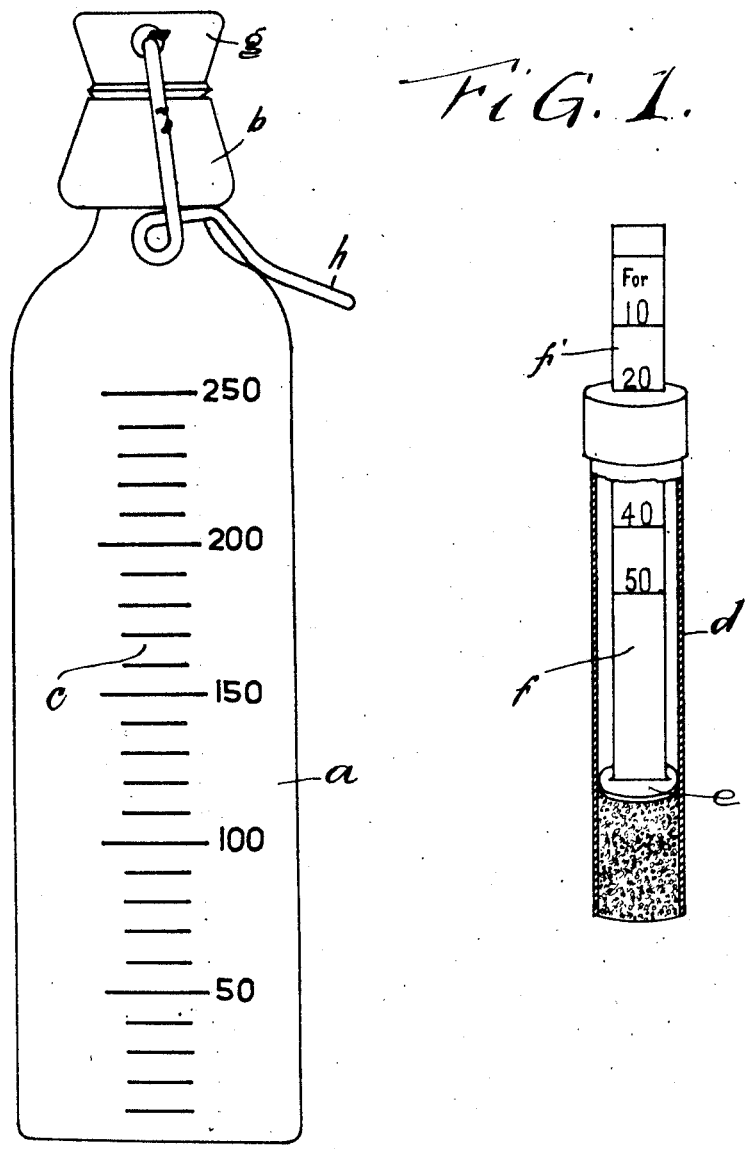

Aug. 2, 1927.
K. HOEFELMAYR
1,637,415
APPARATUS FOR PREPARING LIQUID MILK FROM MILK POWDER
Filed April 16, 1926    2 Sheets-Sheet 2
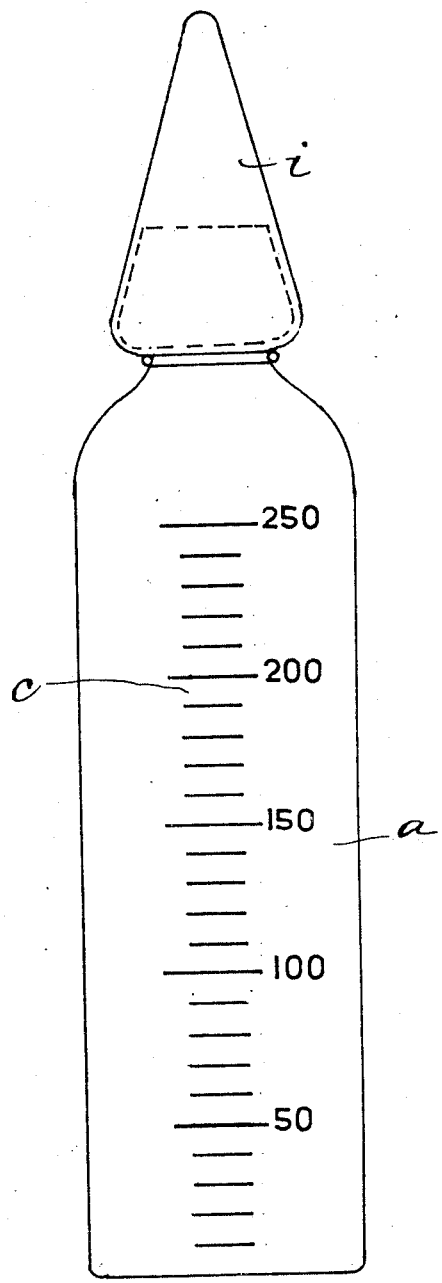
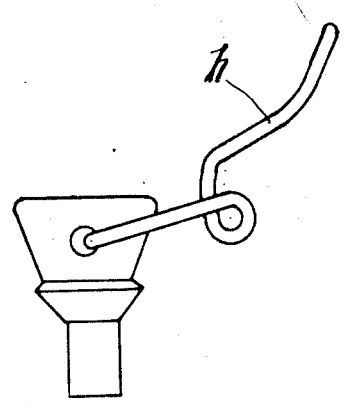
FIG.2.
K. Hoefelmayr
INVENTOR
By: Marks & Clerk
Attys Patented Aug. 2, 1927.

1,637,415

UNITED STATES PATENT OFFICE.

KARL HOEFELMAYR, OF KEMPTEN IN ALLGAU, GERMANY.

APPARATUS FOR PREPARING LIQUID MILK FROM MILK POWDER.

Application filed April 16, 1926. Serial No. 102,555.

It has already been proposed to prepare liquid milk by mixing milk powder with water. The advance made in the manufacture of milk powder has led to milk powder being used to an increasing extent for feeding infants, more particularly as the use of milk powder enables the milk for feeding the infant to be concentrated to an extent suited to its bodily condition.

The present invention has for its object to provide an apparatus for preparing a liquid milk food from dried milk or milk powder in a simple manner and always to give it the correct nutritive value. The new arrangement consists substantially of two vessels, a milk vessel for mixing the dried milk or milk powder with liquid, for instance water, and a measuring vessel for measuring the quantity of milk powder to be used. Each vessel is provided with a different scale, these scales bearing such a relation to one another that similar numbers in the scales indicate the quantities of liquid or milk powder, which, when mixed together, produce the normal concentration. Another feature of the invention consists in providing the mixing vessel, which also acts as a feeding bottle, with a removable stopper, the arrangement being such that the bottle is first used for shaking and mixing the powder with the liquid, whereupon the stopper is removed and replaced by a teat.

The invention is illustrated in the accompanying drawings, in which Figure 1 shows the mixing bottle closed with the stopper and the measuring vessel partly in section, and Figure 2 the mixing bottle with the stopper removed and replaced by a teat.

$a$ is the milk bottle. It is provided with a tapering neck $b$ and bears on the outside a scale $c$. The graduations of the scale, which is marked at convenient intervals with numerals, represent a unit quantity of liquid, for instance from graduation to graduation 10 cubic centimetres. Each fifth graduation is thus marked appropriately, viz. 50, 100, 150, 200, 250 cubic centimetres. Thus, if water be poured into the mixing bottle up to the graduation 100, the person filling the bottle will know that it contains 100 cubic centimetres of water. The measuring vessel for the milk powder consists of an outer cylindrical tubular part $d$, in which is a plunger $e$ which is capable of being slid up and down easily. To the upper side of the plunger $e$ is fixed a measuring bar $f$ bearing a scale $f'$, the graduations of which are marked 10, 20, 30, 40, 50, the numeral 30 being covered up in Figure 1. The cross-section of the measuring tube $d$ is such that with the plunger in the position shown in Figure 1 20 parts of milk powder can be held in the container. The operation of the measuring appliance is very simple. It need only be introduced into the milk powder and pressed down until the desired number of units of dried milk have entered the tubular part from below. When, for instance, 20 parts have entered, the measuring bar $f$ will protrude from the cover as far as the numeral 20. The contents of the measuring vessel can then be transferred to the bottle. As according to the invention the scale graduations of the measuring slide are made proportional to the scale graduations of the bottle, such that similar numbers indicate the normal content of the liquid milk, a normal milk is obtained, if, after the contents of the measuring tube $d$ have been poured into the bottle, water is poured into the latter up to the graduation 20. A removable stopper $g$ which is provided with a spring fastening device $h$ of a known kind is then placed on the bottle and the latter closed by pressing down the device $h$. The contents are thereupon shaken, until the milk powder is completely dissolved in the water. The stopper $g$ is then removed and replaced by a rubber teat $i$, when the bottle is ready to give to the infant.

If the doctor should prescribe milk in a more dilute state, for instance having half the nutritive value, 40 instead of 20 cubic centimetres of water are poured into the bottle before mixing.

As the scales on the mixing vessel (bottle $a$) and the measuring vessel (tube $d$) are so correspondingly graduated that similar numerals indicate the quantities of milk powder and liquid, which, when mixed together, produce normal milk, the apparatus according to the present invention provides a ready means for preparing and mixing a milk in any required concentration, as any deviations upwards or downwards can be easily determined or calculated by the doctor at any time. As the dried milk is usually dissolved with warm water, it is possible, owing to the mixing vessel being itself used as the feeding bottle, to give the milk to the infant in the same vessel immediately after being mixed and prepared, by removing the stopper and replacing it by the teat. It is thus not necessary to transfer the milk from a special mixing vessel into a feeding bottle, as has been the case hitherto. This eliminates a further possible source of contamination of milk intended for feeding infants.

What I claim is:

1. An apparatus for preparing liquid milk from milk powder, comprising in combination a mixing vessel, a scale on the said mixing vessel, a measuring vessel and a scale on the said measuring vessel, the graduations of the two scales being so related to each other that similar graduations on the two vessels indicate quantities of liquid and milk powder, which, when mixed together, constitute normal milk, as set forth.

2. An apparatus for preparing liquid milk from milk powder, comprising in combination a mixing feeding bottle, a removable stopper for closing the said bottle, when being used as a mixing vessel, a teat for replacing the stopper, when the bottle is being used as a feeding bottle, a scale on the mixing feeding bottle, a measuring vessel and a scale on the said measuring vessel, the graduations of the two scales being so related to each other that similar graduations on the bottle and the vessel indicate quantities of liquid and milk powder, which, when mixed together, constitute normal milk, as set forth.

In testimony whereof I have signed my name to this specification.

KARL HOEFELMAYR.